United States Patent [19]

Lahl

[11] 4,062,250

[45] Dec. 13, 1977

[54] GEAR TRAIN FOR INTERCONNECTING SIDE-BY-SIDE POSITIONED DRUMS, ROLLS, WHEELS, ETC.

[75] Inventor: Gerhard Lahl, Peine, Germany

[73] Assignee: ELMEG Elektro-Mechanik GmbH, Peine, Germany

[21] Appl. No.: 723,974

[22] Filed: Sept. 16, 1976

[30] Foreign Application Priority Data

Sept. 16, 1975 Germany ............................ 2541181

[51] Int. Cl.² ........................ F16H 1/06; F16H 55/04; F16H 27/04

[52] U.S. Cl. ...................................... 74/415; 74/84 R; 74/436

[58] Field of Search ............................ 74/415, 436, 84

[56] References Cited

U.S. PATENT DOCUMENTS

| | | | |
|---|---|---|---|
| 137,262 | 3/1873 | Van Vleck | 74/436 X |
| 2,905,002 | 9/1959 | Cupák | 74/84 |
| 3,397,585 | 8/1968 | McGowan | 74/436 X |
| 3,448,624 | 6/1969 | Brown | 74/436 X |
| 3,473,390 | 10/1969 | Brown et al. | 74/436 X |
| 3,638,509 | 2/1972 | Hunt | 74/436 |

*Primary Examiner*—Leonard H. Gerin
*Attorney, Agent, or Firm*—Ralf H. Siegemund

[57] ABSTRACT

The digit rolls of a counter a connected through transfer pinions in that pins extending axially from one roll towards another one engage a pinion once per revolution and the pinion turns the other roll by one step. The pins of the two rolls overlap axially with a slight radial clearance so that the gap between the rolls is just slightly larger than the length of either pin. The pins have semicircular, triangular, trapezoidal or rectangular cross-section.

9 Claims, 10 Drawing Figures

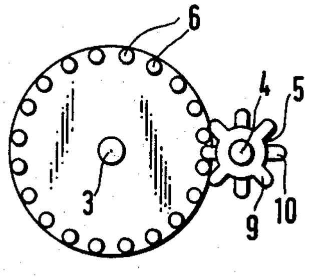
FIG.1
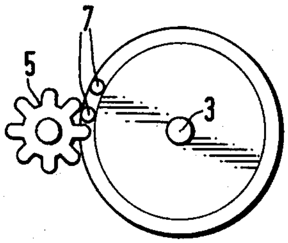
FIG.2
FIG.3
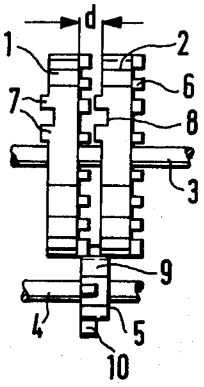
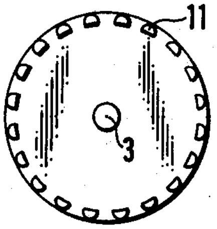
FIG.4
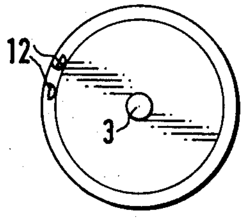
FIG.5
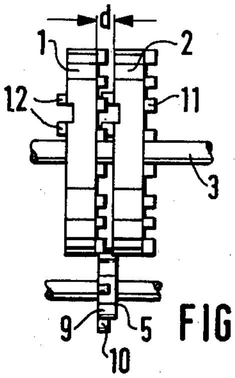
FIG.6
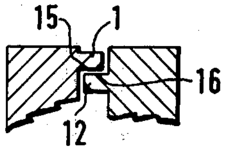
FIG.7
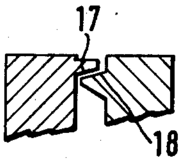
FIG.8
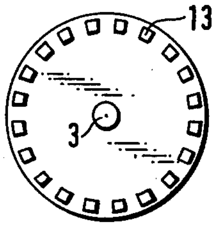
FIG.9
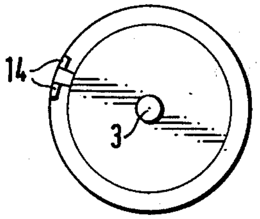
FIG.10

GEAR TRAIN FOR INTERCONNECTING SIDE-BY-SIDE POSITIONED DRUMS, ROLLS, WHEELS, ETC.

BACKGROUND OF THE INVENTION

The present invention relates to a gear train in which two or more rolls, wheels, drums, etc., are arranged in side-by-side relation and along a common axis for independent rotation thereon, and wherein respective two such rolls are coupled by a transfer pinion.

Gearing of the type outlined above is used, for example, to interconnect the digit or cipher rolls of a mechanical counter. The digits are, e.g., printed on the periphery of the drums or rolls. In such a counter, the different rolls represent, e.g., different decades. The unit roll will transfer one angular unit step to the tens-roll after on revolution of the unit roll. After one revolution of the tens-roll, an (angular) unit step is transferred to the hundreds roll, etc. The transfer is effected in either case by transfer pinions. The latter are being disengaged from all drums or rolls for resetting the counter.

These counters are specifically constructed in that the pinion is always in engagement with teeth, pins or the like on the respective transferee roll (or the transfer-receiving side of a roll), while the pinion is only temporarily in driving engagement with the transferor roll, namely whenever the latter has completed one revolution. Of course, most rolls act as transferee rolls on one side, and as transferor roll on the other side, there being two different pinions involved accordingly as to each such roll. The roll acting occasionally as transferor roll is for most of its rotation freely rotatable. The transferor side of a roll has, for example, just two teeth to obtain a stepwise rotational transfer step for each completed revolution, while being disengaged from the transfer pinion on that side for most of a full turn.

These rolls or drums are constructed in that the teeth or pins on the transferor side of one roll axially face the teeth or pins on the transferee side of another roll, and the transfer pinion whenever engaging the transferor side pins turns the other roll. The two rolls are axially spaced apart so that pins facing each other axially have sufficient clearance space between them. The space between the rolls is, therefore, at last as large as the sum of the axial lengths of facing pins. The same conditions arise in all of these kinds of gears irrespective of their use. In the case of a counter, the rolls carry ciphers along their periphery which must have a reasonable size for being legible. In the case of an automated counter readout the dimensions of the printed-on ciphers are fixed. This holds true particularly with regard to the width of the characters. According, the axial width of such cipher rolls is more or less a given parameter, and the spacing between adjacent cipher rolls is determined by the transfer construction outlined above. This in turn establishes a particular axial length for a particular counter capacity. It has found that occasionally these conditions have operated as a constraint that cannot be met if mounting space and counter capacity are also given parameters. Such a constraint has been encountered, for example, in telephone charge counters.

DESCRIPTION OF THE INVENTION

It is an object of the present invention to improve gear systems of the type outlined above, particularly for reducing the space between two side-by-side positioned rolls or drums.

It is another object of the present invention to improve the construction of intercoupled digit rolls in counters.

It is a further object of the present invention to increase the available space for placement of digit figures on the periphery of cipher rolls in a counter of a given capacity having but limited mounting space.

In accordance with the preferred embodiment of the present invention it is suggested to construct such a gearing in that respective two, side-by-side and coaxially positioned rolls, drums, wheels, etc., have gearing or transfer pins extending towards each other but in axially overlapping and clearing (i.e., nonengaging) relationship; coupling is provided through a transfer pinion, preferably engaging the pins of one roll etc., all of the time, but occasionally only (e.g., once per revolution) the pins of the other roll, wheel, etc. This way, the space between the wheels or rolls can be reduced to just a little more than the axial length of the pin. Accordingly, the space requirement is reduced or, for a given space, the range of a counter can be increased. Still, alternatively, the axial length of such a drum or roll can be increased so that a wider space for the printed-on digits is available.

The radially facing surface portions of the pins are preferably of complementary contour to minimize the radial gap between them. Also, engagement of either pin with the teeth of the transfer pinion is improved. In the preferred form of practicing the invention, the surfaces of the pins on one roll facing the other pins are segments of a surface (of a hypothetical body) having rotational symmetry to the axis, e.g., segments of a cylinder or of a cone. As this applies to both sets of teeth, the surfaces of two telescoped (hypothetical) cylinders or cones are involved, and their radial spacing defines the radial gap between facing pins. In the case of cones one obtains pins of tapering configuration with wide bases which enhances their stability and strength. A narrow gap improves the transfer conditions as regards the pinion and equalizes the load distribution. The pins may have different kind of cross-section such as semicircular, triangular, trapezoidal.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side elevation of a known cipher or digit roll with a transfer pinion;

FIG. 2 shows the same roll and pinion from the opposite side;

FIG. 3 is a front view of two coupled cipher rolls each constructed as shown in FIGS. 1 and 2;

FIG. 4 is a side elevation of a cipher or digit roll constructed in accordance with the preferred embodiment;

FIG. 5 shows the opposite side of the cipher roll as shown in FIG. 4;

FIG. 6 is a front view of two coupled cipher rolls each constructed as shown in FIG. 4 and 5;

FIG. 7 is a section of an edge zone of the rolls as shown in FIG. 6, but on an enlarged scale;

FIG. 8 is a similar section view as shown in FIG. 7 but illustrating a modification of the pins; and FIGS. 9 and 10 are respectively views similar as FIGS. 4 and 5 but showing a modification of the gearing.

Proceeding now to the detailed description of the drawings, FIGS. 1, 2, and 3 illustrate prior art cipher rolls and their intercoupling via transfer pinions. Particularly there are shown two cipher or digit rolls 1 and 2 each being seated on a common shaft 3 for free rotation thereon. The particular two cipher rolls pertain to a set of cipher rolls and represent two orders of digits within a multidigit number format.

The two rolls 1 and 2 are coupled by a transfer pinion 5 which rotates on a shaft 4. The coupling is effected in the following fashion. Each roll 1, 2 has on one side gear defining elements, which are arranged along the periphery of the roll. Specifically, these elements are cylindrical pins 6; see FIG. 1. The other side of each digit wheel such as depicted in FIG. 2 carries just two such pins 7. As can be seen best in FIG. 3, the pins 7 on one roll, e.g., 2, may face axially two of the pins 6 of roll 1. However, the two rolls may per se rotate independently from each other, because the sets of pins have an axial gap between them.

The two pins 7 are spaced azimuthally by a gap 8 which is sufficiently wide so that one of the axially longer teeth 9 of pinion 5 can reach into the gap 8 for gear-like engagement with the roll 2. Pinion 5 is constructed to have alternatively wider (i.e., axialy longer) teeth 9 and shorter teeth 10. All teeth of pinion 5 can engage the gear-like track as defined by the pins 6 on roll 1. On the other hand, short teeth 10 reach into but clear the gap between the rolls 1 and 2 except that the pins 7 can engage also teeth 10. Thus, roll 2 will drivingly engage pinion 5 only when one of its pins 7 engage a tooth 10, and shortly thereafter the next tooth 9 will lodge in gap 8, and leave it upon further turning thereby advancing the position. This way pinion 5 is turned by a particular angle and that rotation is imparted upon roll 1 as a step of particular angular length. Otherwise, one or two of the long teeth 9 just rest on the periphery of roll 2 as the latter rotates while its pins 7 are out of engagement with any of the teeth of pinion 5 as well as with any of the pins 6.

It can thus be seen that upon completion of one revolution of roll 2, its two pins 7 cause transfer pinion 5 to rotate by a particular angle and that rotation is transmitted as a particular rotational step upon roll 1 which turns by a particular angular step accordingly. During the major portion of the rotation of roll 2, while pins 7 are disengaged from pinion 5, no such transfer occurs.

As can be seen specifically from FIGS. 1, 2, and 3, pins 6 and 7 are equidistantly spaced from the axis of shaft 3 and, therefore, pins 7 and 6 face each other across the axial space between rolls 1 and 2. The sum total of the axial length of the pins 6 and 7 is, therefore, equal to the minimum distance *d* between the rolls 1 and 2. In order to avoid direct engagement of pins 6 and 7 *d* must still be a little larger because pins 6 and 7 should not even frictionally engage but must stay always clear from each other. Tolerances and particularly any slight skew between the wheel axes require that the gap be still larger.

Turning now to the description of FIGS. 4 to 10, these figures show how the distance between respective two adjacent rolls can be reduced to a value smaller than the sum total of the axial lengths of the several pins. FIG. 4 shows pins 11 with a cross-section delineating a semicircle. The curved part of that contour faces radially outwardly on the respective rolls. The other side of the roll carries pins 12 of similar cross-sectional contour except that the curved portions face radially inwardly on the roll. Moreover, the pins 12 are disposed on the roll with a radial offset as compared with pins 11. Specifically, the radial distance of the relatively flat side of pins 11 from the axis of shaft 3 is sufficiently larger than the radial distance of the flat sides of pin 12 from the axis of shaft 3 so that the pins 11 can clear pins 12 and vice versa.

As shown in FIG. 6, the distance *d'* between rolls 1' and 2' is now smaller than *d* in FIG. 3 or, to put it differently, the distance *d'* is only a little larger than the axial length of each pin 11, 12 but less than the sum of the axial length of two pins 11 and 12. Still in other words, the distances *d* and *d'* differ by about one tooth length (all other overall dimensions being similar). Consequently, the axial dimensions of transfer pinion 5' is reduced; particularly the axial length of short teeth 1' is smaller than the length of teeth 10.

The invention has actually been practiced successfully in the following manner. A counter made of parts of the type shown in FIGS. 1 to 3 was disassembled and each pin was axially cut about in half so that pins of the type 11, 12 resulted therefrom. This then permitted the digit wheels to be shifted closer to each other, so that readily a five position counter could be converted into a six position counter.

The cutting of the pins by machining operation was carried out quite accurately so that the cut surface portions of all pins 6 (which thereby became pins 11) where located on a round cylinder surface with an axis coinciding with the axis of shaft 3. The same was true as regards the "conversion" of pins 7 into pins 12 except that the cylinder of which the relatively flat surfaces of pins 12 are segments, had a slightly smaller diameter.

The resulting counter with actually weakened pins was tested over a long time and still operated successfully. Of course, the axial dimensions of the transfer pinions had been also slightly reduced.

The particular contour of teeth 11, 12 is but one example for practicing the invention. FIGS. 9 and 10 show again the opposite sides of a cipher roll and illustrate two modification steps. First of all, the two pins 14 on one, i.e., the transferor side of a roll, may have the large radial distance and, thus, reach over the pins 13 of the neighboring cipher roll, being the transfer receiving or transferee side of that roll.

The second modification illustrated here involves the cross-section of the pins. They may be rectangularly or trapezoidally contoured whereby a trapezoidal cross-section is preferred in that the trapez in each instance tapers radially outwardly. Also, the teeth 13 should have a larger cross-sectional area than teeth 14.

Another modification is the provision of teeth with a triangular cross-section. For example, the outer teeth 14 may have a triangular cross-section while the teeth 13 are trapezoidal, whereby the triangular contour of the outer teeth supplements the trapezoidal contour of the (radially) inner teeth to establish a larger triangle. Also, one can provide other combinations of the types of contours as described, using for example trapezoidal and semicircular teeth. In all these cases one obtains satisfactory engagement with the teeth of the transfer pinion.

FIG. 7 shows in greater detail how, for example, the pins 11 and 12 as per FIGS. 4 to 6 face each other via flat surfaces 15 and 16 across a radial gap. Actually, they are not really flat but making these surfaces flat and of axis parallel extension is one simple way of configuring these pins as to their mutually facing surface portions. However, a more refined contour is preferred and has already been introduced above. Generally speaking the surfaces of the pins facing the pins of the respective other set should all be segments of the surface of a (hypothetical) body of rotational symmetry, the axis of shaft 3 being that axis of symmetry.

These surfaces 15 and 16 may be segments of the concentric cylinder surfaces having the axis of shaft 3 as their common center axis. Of course, the curvature is much less pronounced than the pin curvature as to their semicircularly contoured surface portions. In order to obtain clearance, the cylinder of which surfaces 16 are segments, has a slightly larger diameter than the cylinder of which surfaces 15 are segments. One can also say that truly flat surfaces 16, 17 approximate these two concentric cylinders in the first order.

The surfaces 15 and 16 of the pins 11, 12 when facing each other should be as close as reasonably possible (and as tolerances permit) so that a tooth of the transfer pinion coacting with both of them finds similar load transfer conditions with each of them. Moreover, it was found that in the case of small spacing between two facing pins 11 and 12 (or 13 and 14, etc.) the transfer is carried out particularly accurate. Also the pins should have a relatively large cross-section in that they are sufficiently strong and will not break easily.

FIG. 8 shows a further improvement as far as pin strength is concerned. The pins do not face each other with surfaces that extend parallel to the axis 3, but are oblique and are segments of cones. In other words the surfaces 17, 18 are segments of nested surfaces of hypothetical bodies of rotational symmetry, being cones in this instance.

The pins, therefore, taper in their direction of extension. This way any pin has largest cross-section at its base where emerging from the body of the roll. Such a construction enhances the strength of the pins considerably.

Placing the digit wheels (of a given axial width) closer to each other to better accommodate a given, limited mounting space or to add another stage is one advantage of the gap reduction as per the invention. The other possibility is to -increase the axial width of the digit roll. This has the added advantage that wider and better legible characters can be placed on the circumference. It should be noted that for some cases, particularly for those in which automated read out is of interest, one needs embedded dyes for the characters. This may necessitate to perforate the periphery of the digit wheel and to fill it with dye stuff. Such a technique is applicable only if the wheel is in effect sufficiently wide, as otherwise the structure would be weakened too much, particularly if there is not a fairly solid, uninterrupted rim along the axial end faces of the digit wheels or rolls.

The invention is not limited to the embodiments described above but all changes and modifications thereof not constituting departures from the spirit and scope of the invention are intended to be included.

I claim:

1. In a gear train which includes a first and a second roll arranged in coaxial, axially side-by-side relation to each other and which includes a transfer pinion by means of which the first and second rolls are coupled for transfer of rotation from the first roll to the second roll, the improvement comprising:

the first and the second rolls each having respectively first and second pins, the transfer pinion being disposed for meshing engagement with either and both of the first and second pins, so that the first roll is turned by the pinion in meshing engagement with the first pins when the pinion is rotated by the second roll also in meshing engagement with the second pins, the pinion not being journalled on any of said pins, the pins extending towards each other in a gap between the first and second rolls, in axially overlapping and radially clearing relation, without a mutual engagement, for permitting independent rotation of the rolls except upon mutual coupling through the transfer pinion.

2. In a gear train as in claim 1, wherein the first pins are arranged along the entire periphery of the first roll, there being less second pins than first pins, extending only along a portion of the periphery of the second roll.

3. In a gear train as in claim 1, said first and second pins having parallel surface portions facing each other as extending in an axial direction.

4. In a gear train as in claim 3, said surface portions of the first and second pins being segments of two cylinders having slightly different diameters.

5. In a gear train as in claim 1, said first and second pins having obliquely oriented surface portions.

6. In a gear train as in claim 5, said obliquely oriented surface portions of the first and second pins being respectively segments of two cones.

7. In a gear train as in claim 1, said first and second pins having surface portions which are respectively segments of two nested, rotationally symmetrical surfaces, having a small radial distance between them and extending concentric to the rolls.

8. In a gear train as in claim 1, said pins having cross-sections with semicircle contour.

9. In a gear train as in claim 1, at least those of the pins being closer to the axis having trapezoidal cross-section, tapering in the direction of the axis.

* * * * *